United States Patent
Wada

(10) Patent No.: US 7,933,992 B2
(45) Date of Patent: Apr. 26, 2011

(54) DEVICE MANAGEMENT SYSTEM, DEVICE MANAGEMENT METHOD, INFORMATION PROCESSING APPARATUS, INFORMATION PROCESSING METHOD, PROGRAM, AND STORAGE MEDIUM

(76) Inventor: Katsuhiro Wada, Kawasaki (JP)

( * ) Notice: Subject to any disclaimer, the term of this patent is extended or adjusted under 35 U.S.C. 154(b) by 165 days.

(21) Appl. No.: 12/368,138

(22) Filed: Feb. 9, 2009

(65) Prior Publication Data

US 2009/0204710 A1 Aug. 13, 2009

(30) Foreign Application Priority Data

Feb. 12, 2008 (JP) .................................. 2008-031024

(51) Int. Cl.
G06F 15/173 (2006.01)
(52) U.S. Cl. ........................................ 709/225; 709/224
(58) Field of Classification Search .................. 709/225, 709/220–224; 726/2, 3, 23, 13; 713/100, 713/153, 160; 358/1.13, 1.15, 305
See application file for complete search history.

(56) References Cited

U.S. PATENT DOCUMENTS

| 7,681,226 B2 * | 3/2010 | Kraemer et al. .................. 726/1 |
| 2007/0133044 A1 * | 6/2007 | Tanaka ......................... 358/1.15 |
| 2007/0216939 A1 | 9/2007 | Wada et al. |

FOREIGN PATENT DOCUMENTS

JP 7-044777 A 2/1995

OTHER PUBLICATIONS

Takayama, Copying Machine monitoring system, Feb. 1995, Japan Patent Application 07-044777, A(1995).*

* cited by examiner

*Primary Examiner* — Wing F Chan
*Assistant Examiner* — Ruolei Zong
(74) *Attorney, Agent, or Firm* — Fitzpatrick, Cella, Harper & Scinto

(57) ABSTRACT

A device management system includes a network device and an information processing apparatus. The network device generates request information including the information used to identify the user, and requests to issue access control information including access restriction information indicating whether or not each of the functions of the network device can be used. The information processing apparatus generates access control information which associates the access restriction information with the user information. The network device further controls the use of the respective functions with respect to the operation input in accordance with the access restriction information included in the generated access control information.

23 Claims, 11 Drawing Sheets

F I G. 6

| ACT ISSUANCE REQUEST CLIENT INFORMATION | 192.168.10.200 |
|---|---|
| ACT ISSUANCE REQUEST USER INFORMATION | UserA |
| JOB PROCESSING CONTENTS | COPY |

DEVICE MANAGEMENT SYSTEM, DEVICE MANAGEMENT METHOD, INFORMATION PROCESSING APPARATUS, INFORMATION PROCESSING METHOD, PROGRAM, AND STORAGE MEDIUM

BACKGROUND OF THE INVENTION

1. Field of the Invention

The present invention relates to a security management technique of network devices.

2. Description of the Related Art

It is required to manage devices such as printers in terms of security control, and it is demanded to not only manage users of the devices using IDs and to record logs, but also to reliably record operation records of respective users.

Conventionally, as a saving method of operation records of users in a system that manages devices, a method of appending job data to an operation log is adopted. Furthermore, a method of restricting device operations of devices by appending a video acquired by sensing an image of each operator to the operation log is also adopted. Such a device management method is disclosed in, for example, Japanese Patent Laid-Open No. 7-44777.

However, with the above conventional methods, the following problems are posed. When it becomes possible to use devices even if an operation record is not recorded by an image sensing device, the operation record cannot act as any deterrence as a security function.

In a system that restricts the use of devices based on the operation record of an image sensing device, if the image sensing device malfunctions, all functions are uniformly restricted including those which do not require any operation record based on an administrator's decision, and devices to be managed can no longer be used. For specific users, image sensing of the operation records by the image sensing device is not required in some cases. Even in such cases, the use of devices is uniformly restricted at the time of a malfunction of the image sensing device. Users who are originally free from any influence cannot use devices due to the malfunction of the image sensing device.

Furthermore, it is difficult for each user or administrator to identify which of a device, image sensing device, and storage device that stores sensed image data has malfunctioned, resulting in poor convenience of users.

SUMMARY OF THE INVENTION

The present invention has been made in consideration of the above problems, and has as its object to provide a security management technique for network devices with high convenience.

According to one aspect of the present invention, there is provided a device management system including a network device which is to undergo security management, and an information processing apparatus which generates information used to control the network device for respective functions, the network device comprising: an acceptance unit adapted to accept information used to identify a user and an operation input of the user; and a request unit adapted to generate request information including the information used to identify the user, and to request to issue access control information including access restriction information indicating whether or not each of the functions of the network device can be used, the information processing apparatus comprising: an extraction unit adapted to extract user information used to identify the user from the request information generated by the request unit; a determination unit adapted to determine an operating state of an image sensing unit used to monitor an operation of the user with respect to the network device based on a communication with the image sensing unit; an acquisition unit adapted to acquire, based on the operating state of the image sensing unit based on the determination result of the determination unit and the user information, corresponding access restriction information from a storage unit which stores a plurality of pieces of access restriction information corresponding to combinations of a plurality of operating states and a plurality of pieces of user information; and a generation unit adapted to generate access control information which associates the access restriction information acquired by the acquisition unit with the user information, and the network device further comprising: a control unit adapted to control use for respective functions of the network device with respect to the operation input in accordance with the access restriction information included in the access control information generated by the generation unit.

According to another aspect of the present invention, there is provided a device management method in a device management system including a network device which is to undergo security management, and an information processing apparatus which generates information used to control the network device for respective functions, the method comprising: an acceptance step of controlling an acceptance unit of the network device to accept information used to identify a user and an operation input of the user; a request step of controlling a request unit of the network device to generate request information including the information used to identify the user, and to request to issue access control information including access restriction information indicating whether or not each of the functions of the network device can be used; an extraction step of controlling an extraction unit of the information processing apparatus to extract user information used to identify the user from the request information generated in the request step; a determination step of controlling a determination unit of the information processing apparatus to determine an operating state of an image sensing unit used to monitor an operation of the user with respect to the network device based on a communication with the image sensing unit; an acquisition step of controlling an acquisition unit of the information processing apparatus to acquire, based on the operating state of the image sensing unit based on the determination result of the determination step and the user information, corresponding access restriction information from a storage unit which stores a plurality of pieces of access restriction information corresponding to combinations of a plurality of operating states and a plurality of pieces of user information; a generation step of controlling a generation unit of the information processing apparatus to generate access control information which associates the access restriction information acquired in the acquisition step with the user information; and a control step of controlling a control unit of the network device to control use for respective functions of the network device with respect to the operation input in accordance with the access restriction information included in the access control information generated in the generation step.

According to still another aspect of the present invention, there is provided an information processing apparatus which generates information used to control, for respective functions, a network device comprising an acceptance unit adapted to accept information used to identify a user and an operation input of the user, and a request unit adapted to generate request information including the information used to identify the user, and to request to issue access control information including access restriction information indicating whether or not each of the functions of the network device can be used, the apparatus comprising: an extraction unit adapted to extract user information used to identify the user from the request information generated by the request unit; a determination unit adapted to determine an operating state of an image sensing unit used to monitor an operation of the user with respect to the network device based on a communication with the image sensing unit; an acquisition unit adapted to acquire, based on the operating state of the image sensing unit based on the determination result of the determination unit and the user information, corresponding access restriction information from a storage unit which stores a plurality of pieces of access restriction information corresponding to combinations of a plurality of operating states and a plurality of pieces of user information; and a generation unit adapted to generate access control information which associates the access restriction information acquired by the acquisition unit with the user information.

According to yet another aspect of the present invention, there is provided an information processing method in an information processing apparatus which generates information used to control, for respective functions, a network device comprising an acceptance unit adapted to accept information used to identify a user and an operation input of the user, and a request unit adapted to generate request information including the information used to identify the user, and to request to issue access control information including access restriction information indicating whether or not each of the functions of the network device can be used, the method comprising: an extraction step of extracting user information used to identify the user from the request information generated by the request unit; a determination step of determining an operating state of an image sensing unit used to monitor an operation of the user with respect to the network device based on a communication with the image sensing unit; an acquisition step of acquiring, based on the operating state of the image sensing unit based on the determination result of the determination step and the user information, corresponding access restriction information from a storage unit which stores a plurality of pieces of access restriction information corresponding to combinations of a plurality of operating states and a plurality of pieces of user information; and a generation step of generating access control information which associates the access restriction information acquired in the acquisition step with the user information.

According to the present invention, user-friendly security management of network devices can be implemented.

Further features of the present invention will become apparent from the following description of exemplary embodiments with reference to the attached drawings.

BRIEF DESCRIPTION OF THE DRAWINGS

FIG. 6 is a view showing an example of request information included in an ACT request;

DESCRIPTION OF THE EMBODIMENTS

Preferred embodiments of the present invention will be exemplarily described in detail hereinafter with reference to the drawings. However, components described in these embodiments are merely examples, and the technical scope of the present invention is defined by the scope of the claims but is not limited by individual embodiments to be described hereinafter.

First Embodiment

Figure 1:
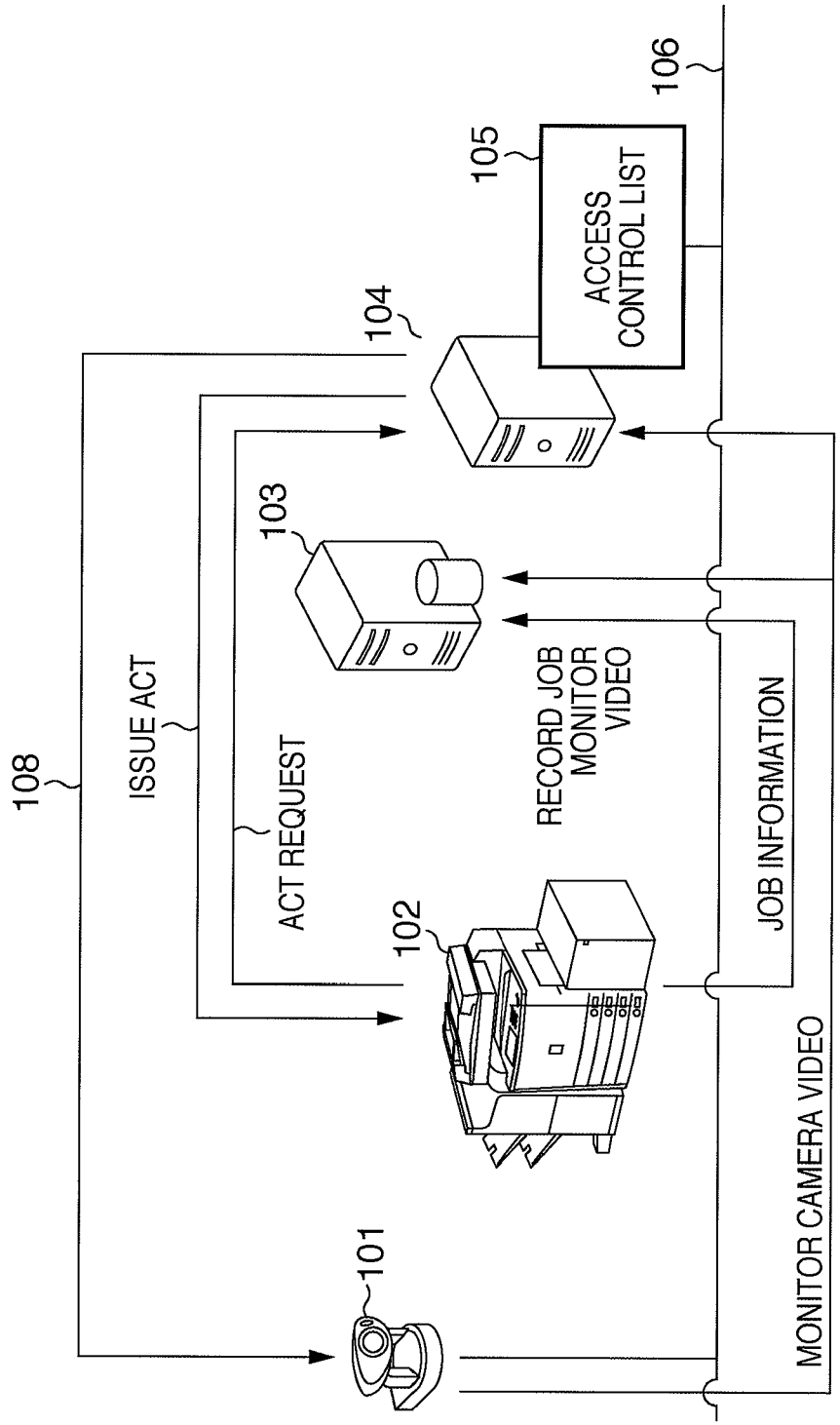
FIG. 1 is a view for explaining the arrangement of a device management system according to an embodiment.

FIG. 1 is a view showing an overview of the arrangement and operations of a device management system according to the first embodiment. Referring to FIG. 1, a network camera 101 serving as an image sensing unit senses an image of a user who operates a network device. When the user operates an MFP (Multifunction Peripheral) 102 as a network device to be managed, the network camera 101 serving as an image sensing unit records an operation record image. That image data is saved in an archive server 103. Note that the image data may be saved in, for example, an access control server 104 in addition to the archive server 103. When a job tracing system that stores job data and an operation log of the user has already been introduced, the image data is also saved as one of multiple job archive log attributes.

The access control server 104 serving as an information processing apparatus holds an access control information list (to be also referred to as "ACL" hereinafter) 105. Based on a request from the MFP 102 as a client, the access control server 104 issues an access control ticket (to be also referred to as "ACT" hereinafter) with reference to the ACL. The ACL 105 includes attributes indicating functions of network devices which are to undergo security management under the access control, and information indicating permission or prohibition of use of device functions for each individual user or a group including that user.

The access control server 104 and archive server 103 are illustrated as independent information processing apparatuses in FIG. 1. However, a single information processing apparatus can execute the functions of both the servers.

When the user wants to perform a copy operation using the MFP 102 as a network device, he or she executes copy processing by inputting an instruction at its operation panel. Upon execution of the copy processing in the MFP 102, an access control unit included in the MFP 102 requests the access control server 104 to issue an access control ticket (ACT). Upon reception of the ACT issuance request, the access control server 104 extracts information used to identify or classify the user from request information included in the ACT request. The information used to identify or classify the user includes the name of the user or a group to which the user belongs. Based on the information such as the user name, information of the job title of the user, an authority group to which the user belongs, or the like is acquired from a user information management server (not shown) or a directory server such as an active directory as user information.

Next, the access control server 104 accesses the access control information list (ACL) 105 using the acquired user information as a key so as to acquire access restriction information. The access control information list (ACL) 105 describes pieces of access restriction information with respect to the MFP 102 for respective users. The access restriction information indicates a range of functions (for example, copy function and FAX function), the use of which is restricted when the user uses the MFP 102. Also, the access restriction information includes, for example, items (e.g., a print upper limit value), which change in response to dynamic state changes that vary based on the operation states of the MFP 102 such as a maintenance timing, toner use amount, and the number of printed sheets.

In this embodiment, some of these pieces of control information are changed in response to a state change of the network camera 101.

The access control server 104 generates an access control ticket (ACT) based on access control information acquired with reference to the access control information list (ACL) 105, and returns the ACT to the MFP 102 as a request source.

The MFP 102 determines based on the access control ticket (ACT) transmitted from the access control server 104 if the ACT permits all functions required by the print processing to be executed currently.

When the received ACT inhibits some or all of the functions to be executed by the print processing, the print processing is not executed, and ends in failure. On the other hand, when the ACT permits all the functions to be executed by the print processing, the MFP 102 executes the print processing.

In this way, an illicit print output or an illicit access to the MFP 102 can be prevented. Note that the ACT can be authenticated by determining if it includes encrypted information as well as, for example, certificate information of the access control server 104.

(Arrangement of Device Management System)

Figure 2:
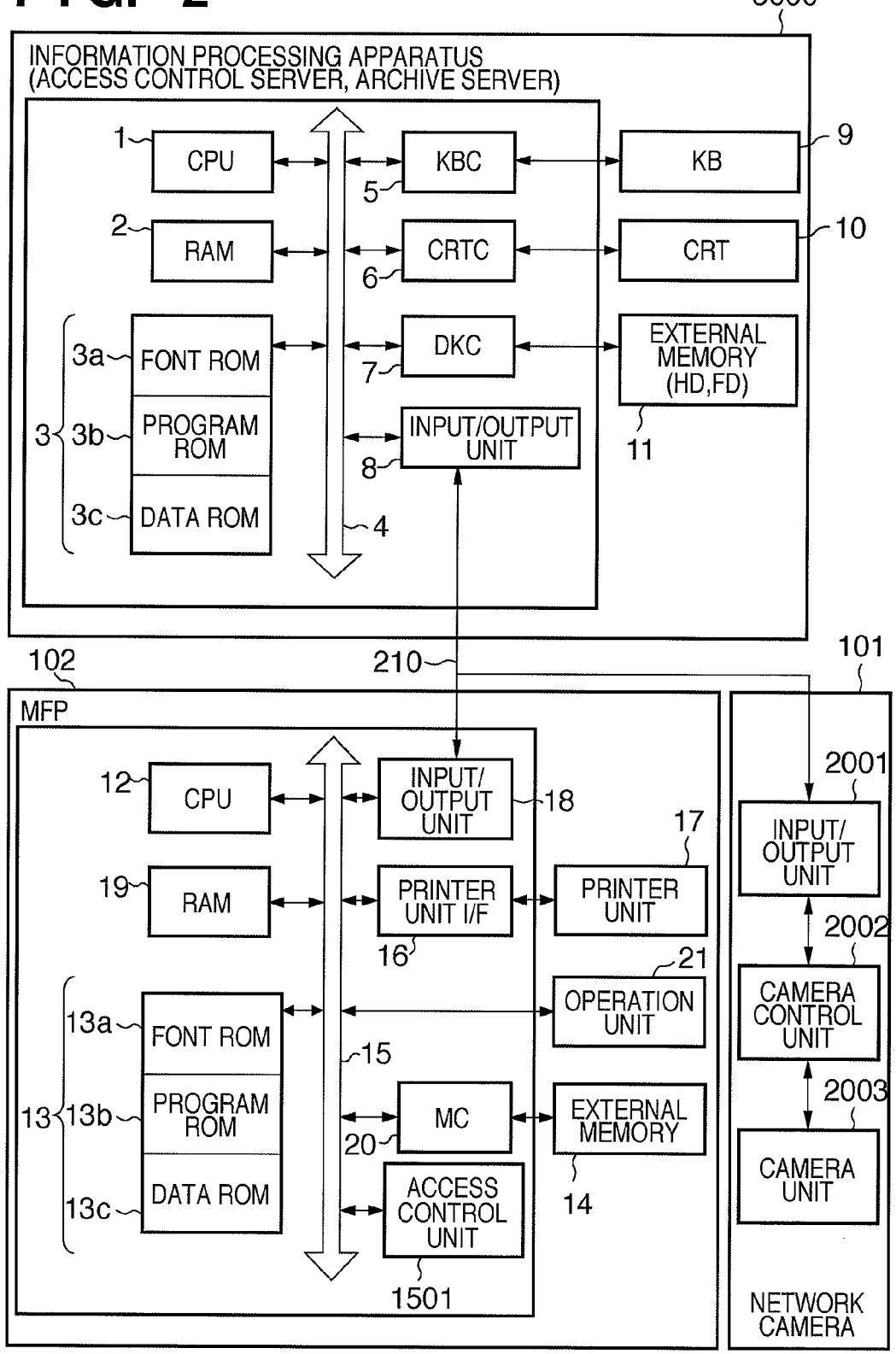
FIG. 2 is a block diagram showing the hardware arrangement of the device management system according to the embodiment.

FIG. 2 is a block diagram showing the principal hardware arrangements of the respective devices described using FIG. 1, and the functions of respective components will be described below with reference to FIG. 2.

Note that the present invention can be applied to a case in which the operations of programs in an information processing apparatus 3000 are executed under the control of a CPU 12 in the MFP 102.

Also, even in a system in which the information processing apparatus 3000 and MFP 102 are connected via a network other than a LAN, WAN, or the like upon execution of processing, the present invention can be applied.

The device management system according to this embodiment includes the information processing apparatus 3000, MFP 102, and network camera 101.

The arrangement of the information processing apparatus 3000 corresponds to those of the archive server 103 and access control server 104. The functions provided by the archive server 103 and access control server 104 are implemented by programs executed under the control of a CPU 1 on the information processing apparatus 3000. The programs are stored in a program ROM 3*b*, and a RAM 2 serves as a work area of the programs. The access control server 104 and archive server 103 can be embedded in a single information processing apparatus, and they can also be embedded in the MFP 102.

(Arrangement of Information Processing Apparatus 3000)

The information processing apparatus 3000 has the CPU 1, the RAM 2, a ROM 3, a keyboard controller (KBC) 5, a CRT controller (CRTC) 6, and a disk controller (DKC) 7. Also, the information processing apparatus 3000 has an input/output unit 8, keyboard (KB) 9, CRT display (CRT) 10, and external memory 11. The CPU 1 systematically controls devices connected to a system bus 4. Based on a document processing program or the like stored in the program ROM 3*b* (to be described later) of the ROM 3 or the external memory 11, document processing including figures, images, characters, tables (including spreadsheets), and the like is executed.

The CPU 1 executes, for example, rasterize processing of outline fonts, and makes display on the CRT display 10. Furthermore, the CPU 1 opens various registered windows based on commands designated using a mouse cursor (not shown) on the CRT display 10, and executes various kinds of data processing.

When the user wants to execute print processing using the MFP 102, he or she opens a window for performing print settings, and can set a print processing method with respect to a printer driver including the setting of the MFP 102 and selection of a print mode.

The RAM 2 serves as a main memory, work area, and the like of the CPU 1. The ROM 3 includes a font ROM 3*a*, the program ROM 3*b*, and a data ROM 3*c*. The font ROM 3*a* or external memory 11 stores font data and the like used in document processing. The program ROM 3*b* or external memory 11 stores an operating system (to be abbreviated as an OS hereinafter) as a control program of the CPU 1, and the like. The data ROM 3*c* or external memory 11 stores various data used in, for example, document processing.

The keyboard controller (KBC) 5 controls key inputs from the keyboard (KB) 9 and a pointing device (not shown). The CRT controller (CRTC) 6 controls display of the CRT display (CRT) 10. The disk controller (DKC) 7 controls access to the external memory 11. The input/output unit 8 is connected to the MFP 102 via a two-way interface 210, and executes communication control processing with the MFP 102. The keyboard (KB) 9 includes various keys. The CRT display (CRT) 10 can display figures, images, characters, tables, and the like. The external memory 11 includes a hard disk (HD) and flexible disk (FD). The external memory 11 stores, for example, a boot program, various applications, font data, user files, edit files, and an MFP control command generation program (to be referred to as a printer driver hereinafter).

(Arrangement of MFP 102)

The arrangement of respective units of the MFP 102 will be described below. The CPU 12 systematically controls devices connected to a system bus 15. An image signal as output information is output to a print unit (printer engine) 17 based on a control program and the like stored in a program ROM 13*b* (to be described later) of a ROM 13 or those stored in an external memory 14.

The CPU 12 can execute communication processing with the information processing apparatus 3000 via an input/output unit 18, and can notify the information processing apparatus 3000 of information in the MFP 102.

A RAM 19 serves as a main memory, work area, and the like of the CPU 12, and its memory size can be expanded using an optional RAM (not shown) connected to an expansion port. The RAM 19 is used as an area for rasterize processing of output information, or an area for storing environment data of the MFP 102. The ROM 13 includes a font ROM 13a, the program ROM 13b, and a data ROM 13c. The font ROM 13a stores font data and the like used upon generation of output information. The program ROM 13b stores a control program of the CPU 12 and the like. The data ROM 13c stores information used on the information processing apparatus 3000 and the like when no external memory 14 such as a hard disk is connected to the MFP 102.

The input/output unit 18 such as a network card exchanges data between the MFP 102 and information processing apparatus 3000 via the two-way interface 210. An access control unit 1501 connected to the system bus 15 sends a request, from an operation unit 21 on which the user makes an operation, to an access control service on the information processing apparatus via the two-way interface 210. In this example, the access control unit 1501 is connected to the system bus 15. However, the access control unit 1501 may be implemented to run on the CPU 12, RAM 19, and ROM 13 of the MFP 102.

A print unit interface (I/F) 16 exchanges data between the CPU 12 and print unit 17. A memory controller (MC) 20 controls access to the external memory 14. The print unit 17 executes a print operation under the control of the CPU 12. The operation unit 21 includes switches and indicators (e.g., LED indicators) for various operations. Furthermore, the MFP 102 has a plurality of functions such as a FAX function, scanner function, and various kinds of send functions. The external memory 14 includes a hard disk (HD), an IC card or the like, and is connected to the MFP 102 as an option. The external memory 14 stores font data, an emulation program, form data, and the like, and undergoes access control of the memory controller (MC) 20. The number of external memories 14 is not limited to one, but a plurality of external memories 14 can be connected. That is, a plurality of external memories including an option card in addition to built-in fonts and an external memory storing programs used to interpret printer control languages of different language systems may be connected. Furthermore, the MFP 102 may include an NVRAM (not shown), which may store printer mode setting information from the operation unit 21.

(Arrangement of Network Camera 101)

The network camera 101 has an input/output unit 2001, and is connected to a network such as Ethernet. Furthermore, the network camera 101 has a camera control unit 2002 and camera unit 2003. The camera control unit 2002 controls the camera unit 2003, and transmits image data via the input/output unit 2001. Moreover, the camera control unit 2002 includes WEB server and WEB service functions, and can easily control acquisition and management and monitor functions of images and status information from external devices using the HTTP protocol.

(Configuration of Software Modules)

Figure 3:
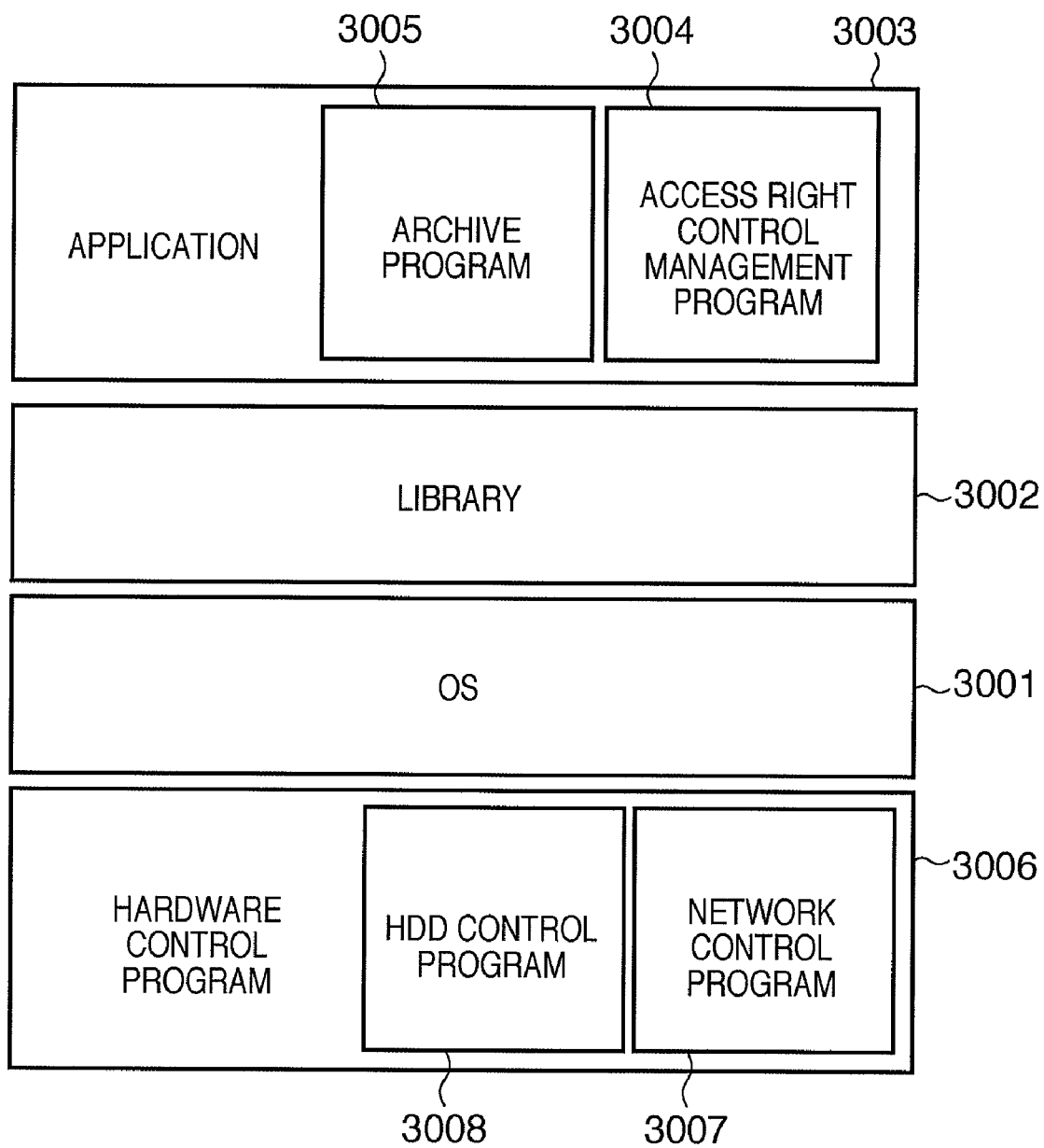
FIG. 3 is a block diagram showing the configuration of software modules in an information processing apparatus.

FIG. 3 is a block diagram showing the configuration of software modules in the information processing apparatus 3000. Referring to FIG. 3, reference numeral 3001 denotes an operating system (OS); 3002, a library; and 3003, applications. The applications 3003 include an access right control management program 3004 and archive program 3005. Reference numeral 3006 denotes hardware control programs, which include a network control program 3007 and hard disk (HDD) control program 3008.

Figure 4:
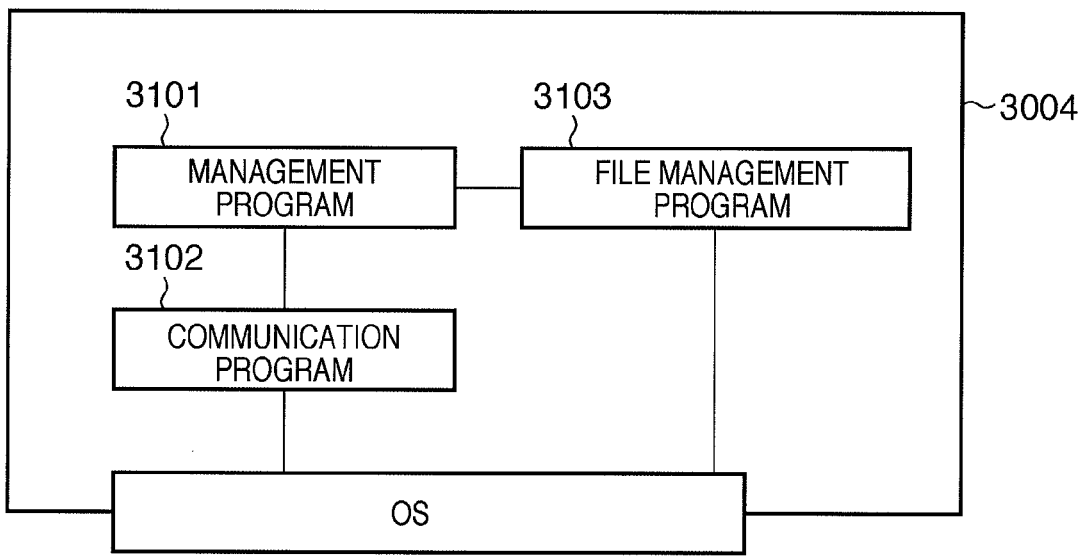
FIG. 4 is a block diagram showing the configuration of an access right control management program.

FIG. 4 is a block diagram showing the configuration of the access right control management program 3004. The access right control management program 3004 is implemented as one of the applications 3003 on the information processing apparatus 3000. Referring to FIG. 4, reference numeral 3101 denotes a management program as a main part of the access right control management program 3004, which controls the access right control management program 3004 as a whole. A communication program 3102 performs operations including communications between the MFP 102 and information processing apparatus using the network control program 3007, receives an ACT acquisition request from the MFP 102, and verifies the authenticity of the ACT acquisition request. A file management program 3103 implements information management such as an ACL (to be described later) using the hard disk (HDD) control program 3008.

The communication program 3102 implements, for example, return of an ACT generated in response to an ACT acquisition request from the access control unit 1501 of the MFP 102 at the time of execution of, for example, copy processing. Note that the ACT acquisition request from the MFP 102 is not limited to that to be sent at the time of execution of the copy processing. For example, an ACT acquisition request is transmitted to the access control server 104 serving as the information processing apparatus prior to execution of a print, scan, or FAX function as those included in the MFP 102. The access control server 104 generates an ACT in response to the ACT acquisition request, and transmits it to the MFP 102 as a request source. The MFP 102 acquires the ACT transmitted from the access control server 104.

Figure 5:
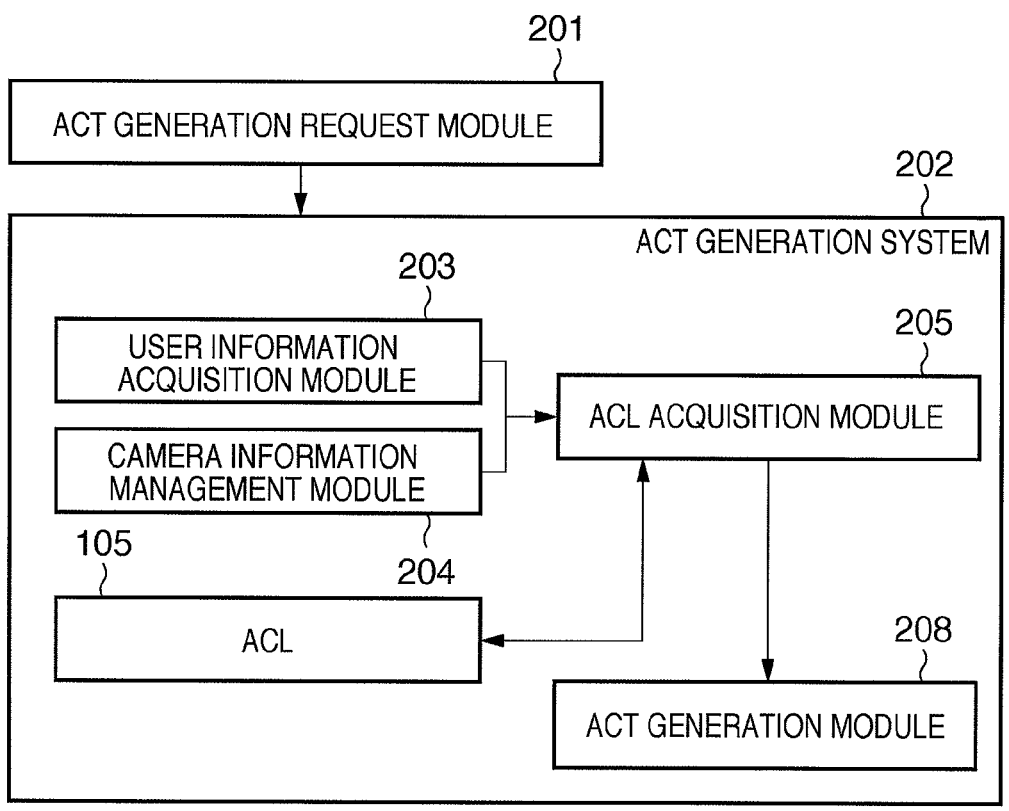
FIG. 5 is a block diagram showing the functional arrangement of an access control server.

A characteristic functional arrangement of the access control server 104 will be described below using FIG. 5. The functional arrangement shown in FIG. 5 is configured by program modules installed by an installation program in the external memory 11 shown in FIG. 2. These program modules are executed by the CPU 1 after they are read out from the external memory 11 and are loaded onto the RAM 2 as needed upon launching the device management system installed in the access control server 104. When the CPU 1 executes the respective program modules, the functional arrangement shown in FIG. 5 is implemented.

An ACT generation request module 201 receives an ACT request from the MFP 102, and passes request information included in the ACT request to an ACT generation system 202. FIG. 6 shows an example of request information in an ACT request issued by the MFP 102 at the time of execution of, for example, the copy function.

FIG. 6 shows an example of request information included in an ACT request. The request information includes IP address information used to identify the MFP 102 that issued the ACT request, user information of the user who issued the request, and information indicating that the processing contents are execution of the copy function. Note that in the MFP 102, it is a common practice for the user to execute user authentication by, for example, inputting a user ID and password as user authentication information or an IC card or biometric authentication from the operation panel before an operation. In this case, the operation panel of the MFP 102 serves as an acceptance unit which accepts user authentication information. Also, in place of the authentication information input via the operation panel, the user may be detected and authenticated based on an image sensing result of the network camera 101. Furthermore, in place of authentication of each individual user, the same access control may be applied to all users.

Referring back to FIG. 5, the ACT generation system 202 receives the request information included in the ACT request acquired by the ACT generation request module 201, and executes processing for issuing an ACT to the MFP 102 that requested the ACT.

In the ACT generation system 202, a user information acquisition module 203 acquires information of the user (user information) who operates the MFP 102.

The user information acquisition module 203 extracts a user name "UserA" from the request information shown in FIG. 6. The user information acquisition module 203 refers to information managed by, for example, a user information management server (not shown) which configures the system, or active directory (to be abbreviated as "AD" hereinafter) based on the extracted user name. The user information acquisition module 203 acquires, as user information, information including the job title of the user, and an authority group to which that user belongs, based on the information acquired by referring to the user information management server or AD.

The acquired user information is passed from the user information acquisition module 203 to an ACL acquisition module 205, and is used in the subsequent processing. Upon execution of security management of jobs using respective functions (including copy, FAX, and scan functions) of the MFP 102, the access control server 104 can identify an individual user or department as a job request source based on the user information.

A camera information management module 204 has a management table which stores information of the MFP 102 and the network camera 101 associated with the MFP 102, and information of the archive server 103 which saves image data of the network camera 101. The pieces of information of the network camera 101 and archive server 103 stored in the management table include information indicating an operating state of each network camera, and information indicating that of the archive server 103.

The camera information management module 204 identifies the network camera 101 associated with the MFP 102 as an ACT request source with reference to the management table, and acquires information of the operating state of that network camera 101. Furthermore, the camera information management module 204 acquires information of the operating state of the archive server 103 which saves image data of the network camera 101.

The camera information management module 204 determines the operating state of the network camera 101, for example, if the network camera 101 is operative or inoperative, and passes information of that determination result to the ACL acquisition module 205. Note that the operating state is not limited to the operative or inoperative state, and operative states according to respective setting conditions such as settings of a resolution and an angle of view can be defined as the operating state. In this case, the camera information management module 204 acquires respective setting conditions from the network camera 101 and can determine the operating state specifically.

The ACL acquisition module 205 accesses the access control information list (ACL) 105 based on the user information and the information about the operating state of the network camera 101, and acquires access restriction information with respect to the MFP 102. The ACL acquisition module 205 passes the access restriction information, user information, and information about the operating state of the network camera 101 to an ACT generation module 208. The ACL acquisition module 205 associates, for example, information about the operating state of the archive server 103 that stores image data sensed by the network camera 101 with the information about the operating state of the network camera 101. The ACL acquisition module 205 can pass the associated information to the ACT generation module 208.

The ACT generation module 208 generates an access control ticket (ACT) based on the access restriction information, user information, information about the operating state of the network camera 101, and the like, and transmits the ACT to the MFP 102 as a request source.

(ACT Generation Processing)

Figure 7:
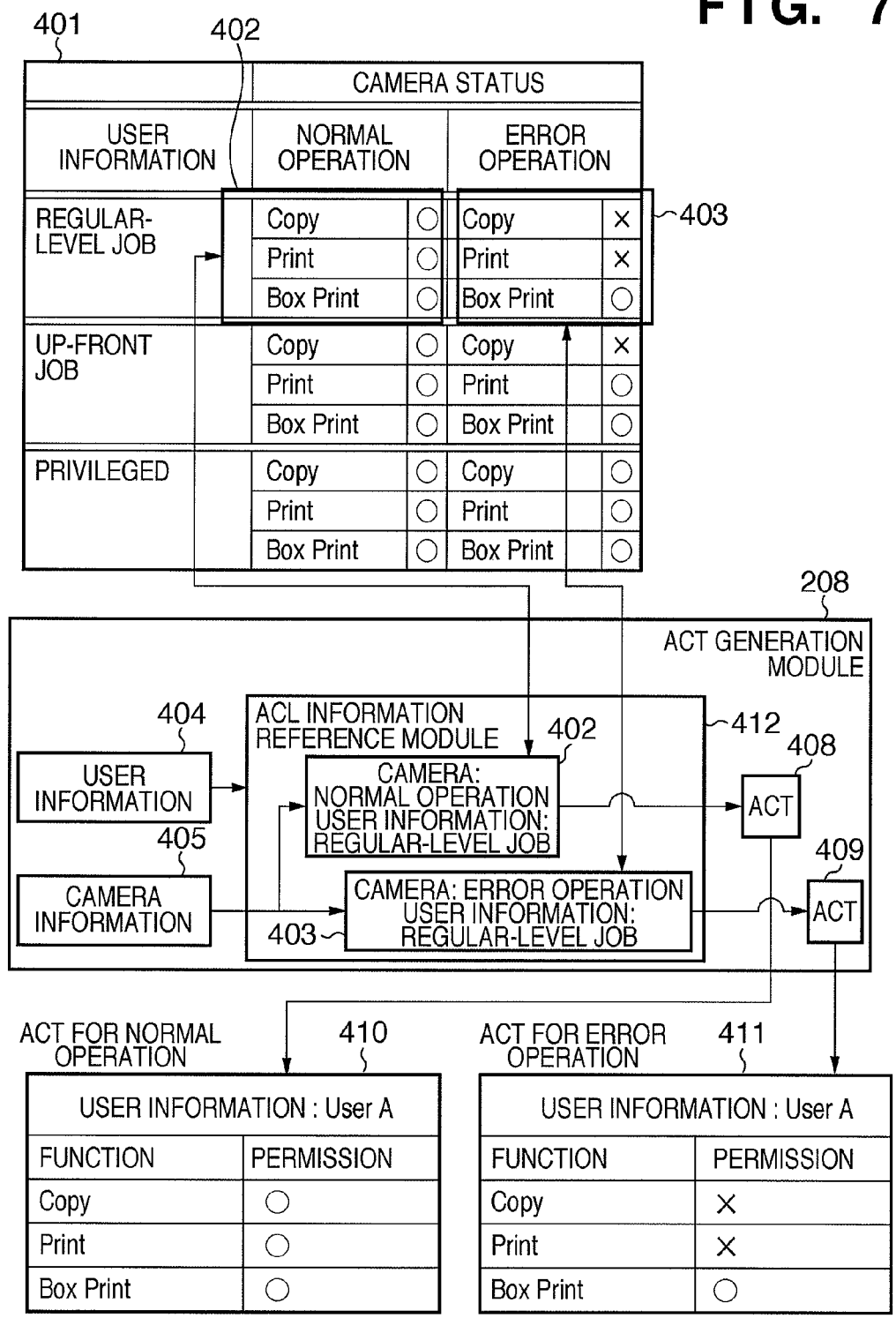
FIG. 7 is a view for explaining an overview of ACT generation processing in an ACT generation module.

The ACT generation processing in the ACT generation module 208 will be described in detail below with reference to FIG. 7. Referring to FIG. 7, an ACL 401 shows a practical example of the access control information list (ACL) 105 shown in FIG. 1. The ACL 401 is stored as a table stored in the external memory 11 on the access control server 104, and the ACL acquisition module 205 described in FIG. 5 can refer to that ACL as needed.

The ACL 401 stores user information, camera statuses (information indicating the camera operating states), function restriction information of devices for respective camera statuses, and the like as information included in the access restriction information. In FIG. 7, the camera statuses are classified into a normal operating state and error state of the network camera 101 for the sake of simplicity. Settings that classify the operating state of the network camera in more detail are also available. For example, the information indicating camera statuses may include, for example, information indicating if the archive server 103 is in a malfunction state as the operating state of the archive server 103 associated with the network camera 101, and the presence/absence of a communication failure of a network.

Each user information registered in the ACL 401 is set with information indicating permission or prohibition of use of the device functions in accordance with the camera statuses. In FIG. 7, information indicating permission of use of each device function is indicated by "○", and information indicating prohibition is indicated by "×".

In the ACL 401, the user information is classified into a regular-level job, up-front job, privileged user, and the like, and pieces of restriction information for respective functions of the MFP 102 that allow the users of respective job titles to use are set. In the example of FIG. 7, the user information is classified into job titles such as a regular-level job and up-front job. However, the classifications of the user information are not limited to the example of FIG. 7. For example, a user group including the name of an individual holding each job title or the name of a group or organization to which a plurality of users belong may be defined and registered as user information.

Reference numeral 402 denotes access restriction information acquired from the ACL 401 when the user information is "regular-level job" and the status of the network camera 101 is "normal operation". In this case, a user of the regular-level job can use copy (Copy), print (Print), and BOX print (Box Print) functions.

Likewise, reference numeral 403 denotes access restriction information acquired from the ACL 401 when the user information is "regular-level job" and the status of the network camera 101 is "error operation". In this case, a user of the regular-level job cannot use the copy and print functions since these functions are restricted, but he or she can use the BOX print function. This embodiment uses "normal operation" and "error operation" in the above description. However, these statuses may be called first and second operating states as long as information can identify the status of the operating state of the network camera.

The ACL acquisition module 205 determines, based on the acquired camera information, if the network camera 101 associated with the MFP 102 is in a normal or error operating state. Then, the ACL acquisition module 205 accesses the ACL 401 based on the acquired user information and the determination result of the operating state of the network camera 101, and acquires corresponding ACL table information as access restriction information.

The ACT generation module 208 receives the pieces of access restriction information 402 and 403 acquired by the ACL acquisition module 205, user information 404, and camera information 405 indicating the operating state of the network camera 101. An ACL information reference module 412 refers to the camera information 405. If the network camera 101 is in a normal operating state, the ACL information reference module 412 generates an ACT 408 based on the access restriction information 402 corresponding to the normal operating state and the user information 404. On the other hand, if the network camera 101 is in an error operating state, the ACL information reference module 412 generates an ACT 409 based on the access restriction information 403 corresponding to the error operating state, and the user information 404.

Reference numeral 410 denotes practical contents of the access control ticket (ACT) 408. User A can use the copy (Copy), print (Print), and BOX print (Box Print) functions in correspondence with the normal operating state of the network camera 101.

Reference numeral 411 denotes practical contents of the access control ticket (ACT) 409. User A can use the BOX print (Box Print) function but the use of the copy (Copy) and print (Print) functions is restricted in correspondence with the error operating state of the network camera 101.

An access control ticket (ACT) is generated in accordance with the operation state of the network camera 101 at the time of requesting an ACT.

(ACT Generation Processing)

Figure 8:
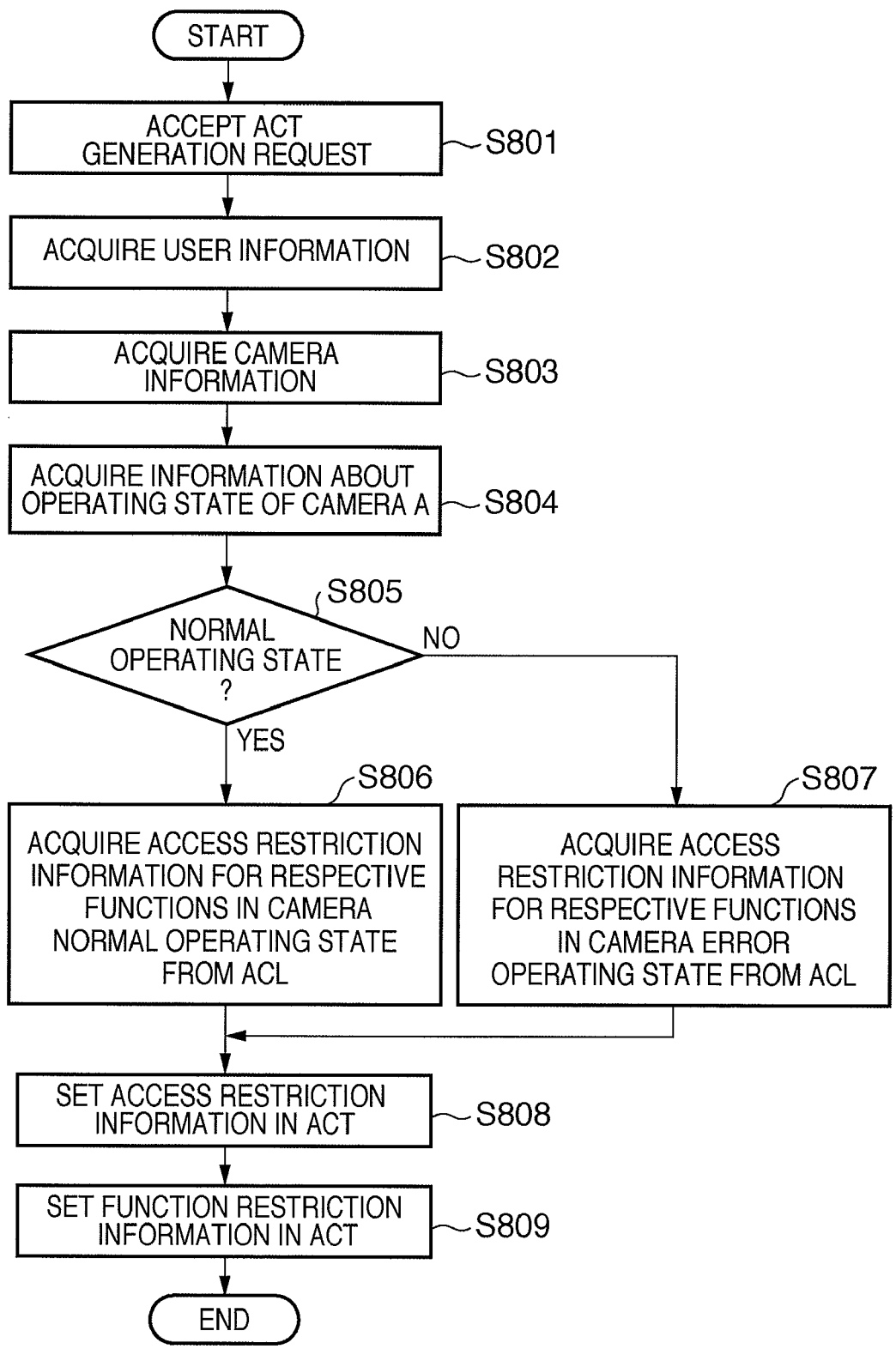
FIG. 8 is a flowchart for explaining the sequence of the ACT generation processing according to the first embodiment.

The sequence of processing from when an ACT request is accepted until the ACT generation module 208 generates an access control ticket (ACT) will be described in detail below with reference to FIG. 8.

In step S801, the ACT generation request module 201 accepts an ACT request issued from the MFP 102 based on a user's operation input, and inputs the ACT request to the ACT generation system 202.

In step S802, the user information acquisition module 203 included in the ACT generation system 202 extracts information such as a user name from request information included in the ACT request, and acquires user information based on the extracted information. As described above, the user information is acquired when the ACT generation system 202 refers to the active directory (AD) or the like based on the user name or the like. The user information is required to access the ACL 105 and is used to identify or classify the user. The user information acquired by the user information acquisition module 203 is input to the ACT generation module 208 via the ACL acquisition module 205.

In step S803, the camera information management module 204 acquires camera information associated with the MFP 102 used to execute copy processing. In this case, the camera information management module 204 acquires a network address (e.g., an IP address) of the network camera 101 associated with the MFP 102. Association between the MFP 102 and network camera 101 is set in advance by an administrator, and the association setting contents are held in the access control server 104 or the archive server 103 which manages videos of the network camera. When a plurality of network cameras are associated with the MFP 102, the camera information management module 204 acquires network addresses (e.g., IP addresses) corresponding to the respective network cameras.

In step S804, the camera information management module 204 acquires status information about the operating state from the network camera 101 associated with the MFP 102 for the purpose of security management. The camera information management module 204 can acquire status information about the operating state of the network camera using, for example, SNMP/MIB as a protocol used to manage network devices. As other methods of acquiring the status information about the operating state of the network camera, a Web service and unique communication protocol can be used as communication methods with the network camera. The status information about the operating state of the network camera is input to the ACT generation module 208 via the ACL acquisition module 205.

The ACL acquisition module 205 determines in step S805 based on the status information about the operating state of the network camera acquired in previous step S804 if the network camera is in a normal operating state.

If the network camera 101 is in a normal operating state, a video sensed by the network camera 101 is stored in the archive server 103. The archive server 103 applies image processing to the sensed video, separates a background image and a main body image of the MFP 102 from the video, and determines if the user who is operating the MFP 102 appears in the video. Note that the image processing is not limited to the processing in the archive server 103. For example, the access control server 104 may receive a video of the network camera 101 from the archive server 103 or network camera 101, and may execute image processing.

As a result of the image processing, if it is determined that the user who is operating the MFP 102 does not appear in the video, the archive server 103 notifies the camera information management module 204 of that determination result. This notification is input to the ACL acquisition module 205 via the camera information management module 204. Upon reception of the determination result indicating that the user does not appear in the video, the ACL acquisition module 205 determines that the network camera 101 is in an error operating state in which the angle of view and image sensing range of the network camera 101 are not appropriately set.

The camera information management module 204 of the access control server 104 can also acquire, from the archive server 103, information about the operating state using, for example, SNMP/MIB used to manage network devices. The camera information management module 204 determines a malfunction state of the archive server 103 and the presence/absence of a network failure based on the information about the operating state.

The network camera 101 acquires information about the operating state of the archive server 103 using SNMP/MIB, and determines a malfunction state of the archive server 103 and the presence/absence of a network failure. When a video cannot be accumulated due to a malfunction of the archive server 103 or a network failure, the network camera 101 notifies the camera information management module 204 of that state.

If a video cannot be accumulated due to a malfunction state of the archive server 103 or a network failure, or if the user does not appear in the video, the ACL acquisition module 205 determines that the network camera 101 is in an error operating state.

If the normal operating state is determined in the determination process in step S805 (YES in S805), the process advances to step S806, and the ACL acquisition module 205 acquires access restriction information for respective functions of the MFP 102 in the normal operating state from the ACL 105 in accordance with the user information. On the other hand, if it is determined in the determination process in step S805 that the network camera 101 is in an error operating state (NO in S805), the process advances to step S807, and the ACL acquisition module 205 acquires access restriction information for respective functions of the MFP 102 in the error operating state from the ACL 105.

The access restriction information acquired in step S806 or S807 is input from the ACL acquisition module 205 to the ACT generation module 208.

In step S808, the ACT generation module 208 sets the input user information and access restriction information in an access control ticket (ACT).

In step S809, the ACT generation module 208 returns the access control ticket (ACT) to the MFP 102 as an ACT request source.

Upon reception of the ACT, the CPU 12 of the MFP 102 confirms the functions that the user can use based on the contents of the access restriction information set in the ACT. When the user is about to use a function of the MFP 102, which is inhibited from being used based on the access restriction information of the ACT, the CPU 12 restricts the use of that function. For example, when the user proceeds to use the inhibited function, the CPU 12 forcibly terminates the processing as error processing, thus restricting the use of the restricted function of the MFP 102.

In, for example, a secure print function which uses the MFP 102 as a printer from a host computer, a print job is temporarily accumulated in the MFP, and print processing is executed after the user is authenticated by the main body of the MFP 102. In this case, the MFP 102 acquires user information and access restriction information from the ACL. When an operation at the host computer is required at the time of, for example, a print operation, information of an operation unit of the host computer or a monitor camera in a room where the host computer exists can be used in addition to the monitor camera for the operation unit of the MFP 102.

As described above, according to this embodiment, user-friendly security management of network devices can be implemented.

Second Embodiment

The first embodiment has explained the arrangement which uses one network camera 101 (image sensing unit) serving as a monitor camera. This embodiment will explain an arrangement that uses a plurality of network cameras. An example in which two network cameras are used will be explained below. However, the gist of the present invention is not limited to such specific example, and the present invention can be applied to a system using two or more network cameras.

Figure 9:
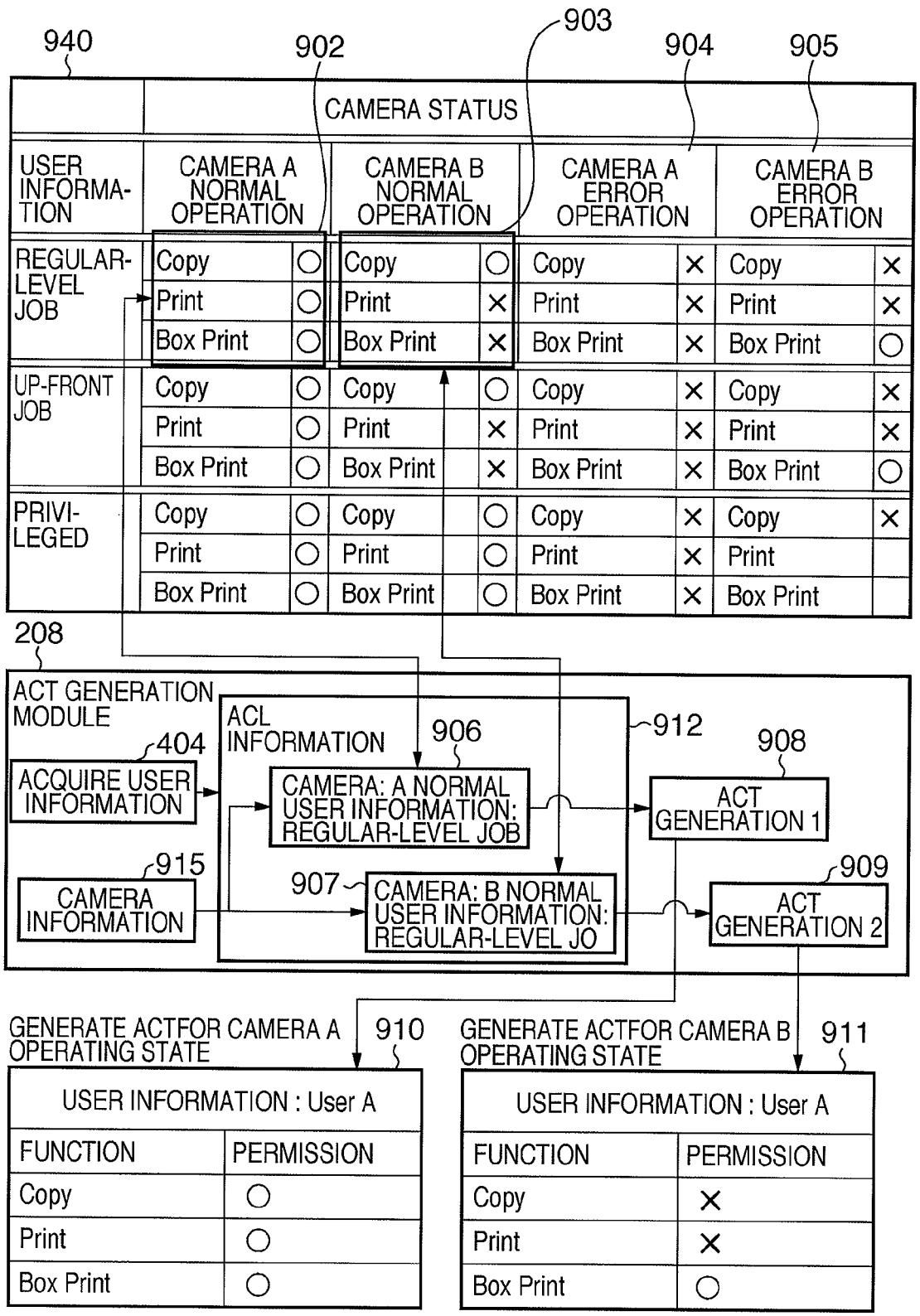
FIG. 9 is a view for explaining an overview of the ACT generation processing in the ACT generation module.

FIG. 9 is a view for explaining an overview of ACT generation processing in an ACT generation module. An access control list (ACL) 940 stores access restriction information corresponding to different functions of a plurality of cameras (cameras A and B). The same reference numerals in FIG. 9 denote the same parts as in FIG. 7, and a repetitive description thereof will be avoided.

In the ACL 940, reference numeral 902 denotes access restriction information acquired from the ACL 940 when user information is "regular-level job" and the status of network camera A is "normal operation". In this case, a user of the regular-level job can use copy (Copy), print (Print), and BOX print (Box Print) functions.

Likewise, reference numeral 903 denotes access restriction information acquired from the ACL 940 when user information is "regular-level job" and the status of network camera B is "normal operation". In this case, a user of the regular-level job cannot use the print (Print) and BOX print (Box Print) functions since these functions are restricted, but he or she can use the copy function. In this embodiment, the ACL 940 includes access restriction information 904 when network camera A is in an error operating state, and access restriction information 905 when network camera B is in an error operating state, in addition to those in the normal operating state.

The ACL acquisition module 205 determines based on camera information acquired from network cameras A and B if the network cameras 101 associated with the MFP 102 are in a normal or error operating state. Then, the ACL acquisition module 205 accesses the ACL 940 based on the acquired user information and the determination result of the operating states of the network cameras 101, and acquires corresponding ACL table information as access restriction information.

The ACT generation module 208 receives the two pieces of access restriction information 902 and 903 acquired by the ACL acquisition module 205, user information 404, and camera information 915 indicating the operating states of network cameras A and B. Note that the camera information 915 includes information indicating the operating states of network cameras A and B. When the system is configured using N (N≧2) network cameras, the camera information 915 includes N (≧2) pieces of information indicating the operating states of the N (≧2) network cameras.

An ACL information reference module 912 refers to the camera information 915. If network cameras A and B are in a normal operating state, the ACL information reference module 912 generates ACTs 908 and 909 based on the two pieces of access restriction information 902 and 903 corresponding to the normal operating state, and the user information 404.

The ACT 908 is an access control ticket (ACT) generated based on the access restriction information 902 when network camera A is in a normal operating state, and the user information 404.

The ACT 909 is an access control ticket (ACT) generated based on the access restriction information 903, when network camera B is in a normal operating state, and the user information 404.

On the other hand, when network cameras A and B are in an error operating state, the ACL information reference module 912 generates access control tickets (ACTs) based on access restriction information corresponding to the error operating state and the user information 404.

Access control tickets (ACTs) are respectively generated according to the operating states of network cameras A and B at the time of the ACT request.

Reference numeral 910 denotes practical contents of the access control ticket (ACT) 908. User A can use the copy (Copy), print (Print), and BOX print (Box Print) functions in correspondence with the normal operating state of network camera A.

Reference numeral 911 denotes practical contents of the access control ticket (ACT) 909. In correspondence with the normal operating state of network camera B, user A can use the BOX print (Box Print) function, but the use of the copy (Copy) and print (Print) functions is restricted.

(ACT Generation Processing)

Figure 10:
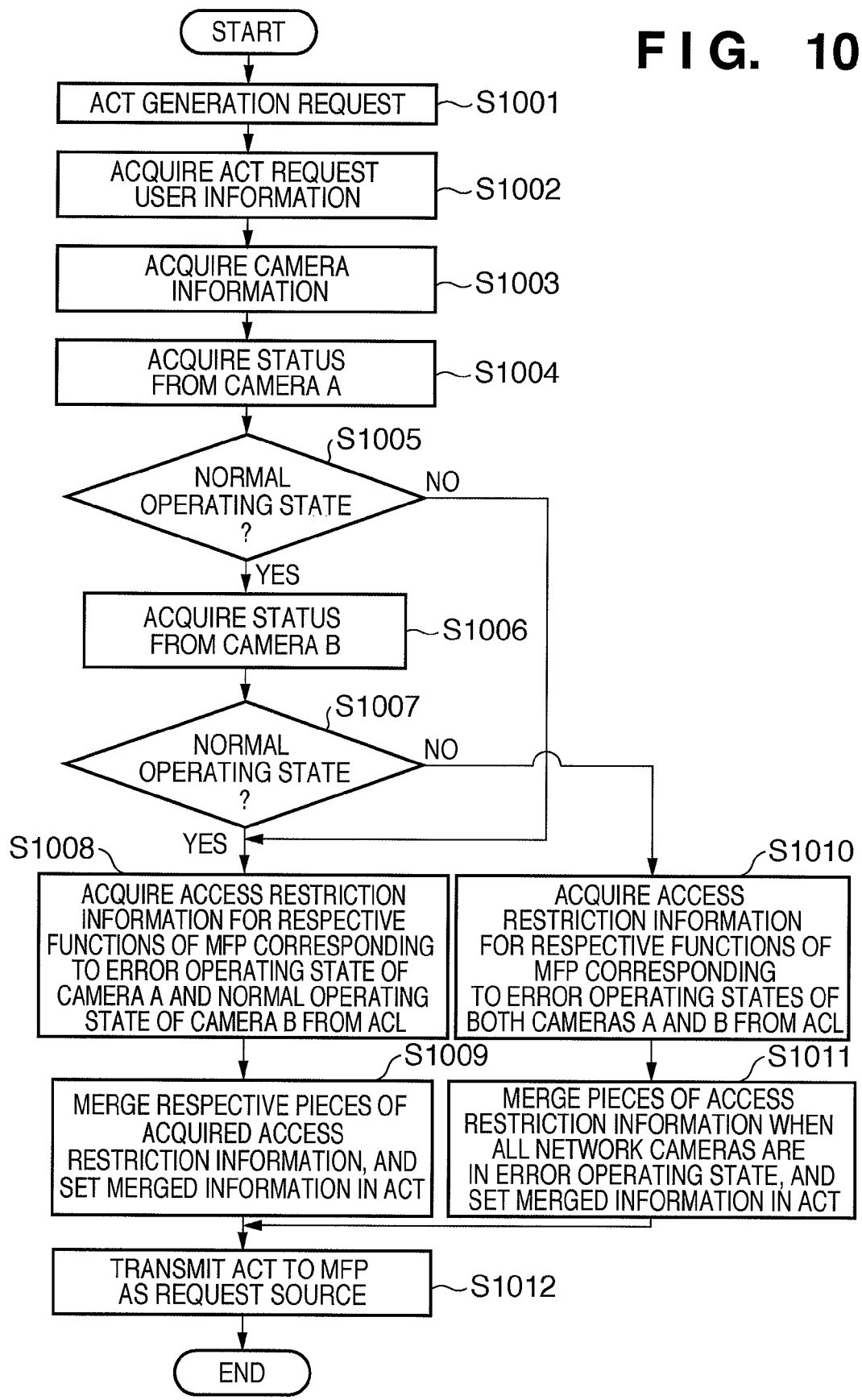
FIG. 10 is a flowchart for explaining the sequence of ACT generation processing according to the second embodiment.

The sequence of processing from when an ACT request is accepted until the ACT generation module 208 generates an access control ticket (ACT) will be described in detail below with reference to FIG. 10.

In step S1001, the ACT generation request module 201 accepts an ACT request issued from the MFP 102, and inputs the ACT request to the ACT generation system 202.

In step S1002, the user information acquisition module 203 included in the ACT generation system 202 extracts information such as a user name from request information included in the ACT request, and acquires user information based on the extracted information.

In step S1003, the camera information management module 204 acquires camera information associated with the MFP 102 used to execute copy processing. The camera information management module 204 acquires network addresses (e.g., IP addresses) of network cameras A and B associated with the MFP 102. Association between the MFP 102 and network cameras A and B is set in advance by an administrator, and the association setting contents are held in the access control server 104 or the archive server 103 which manages videos of the network cameras. When a plurality of network cameras A and B are associated with the MFP 102, the camera information management module 204 acquires network addresses (e.g., IP addresses) corresponding to respective network cameras A and B.

In step S1004, the camera information management module 204 acquires status information about the operating state from network camera A associated with the MFP 102 for the purpose of security management.

The ACL acquisition module 205 determines in step S1005 based on the status information about the operating state of network camera A acquired in previous step S1004 if network camera A is in a normal operating state. The determination process as to whether or not network camera A is in a normal operating state is executed by the same process as that in step S805 described in the first embodiment.

If it is determined in step S1005 that network camera A is in a normal operating state (YES in S1005), the process jumps to step S1008.

On the other hand, if it is determined in step S1005 that network camera A is not in a normal operating state (NO in S1005), the process advances to step S1006.

In step S1006, the camera information management module 204 acquires status information about the operating state from network camera B associated with the MFP 102 for the purpose of security management.

If it is determined in step S1007 that network camera B is in a normal operating state (YES in S1007), the process advances to step S1008. On the other hand, if it is determined in step S1007 that network camera B is not in a normal operating state (NO in S1007), the process advances to step S1010.

In step S1008, the ACL acquisition module 205 acquires pieces of access restriction information for respective functions of the MFP 102 corresponding to the error operating state of network camera A and the normal operating state of network camera B from the ACL 105 in accordance with the user information.

In step S1009, the ACT generation module 208 merges the user information and the respective pieces of access restriction information acquired in step S1008, and sets the merged information in an access control ticket (ACT).

If network camera B is not in a normal operating state, the ACL acquisition module 205 acquires pieces of access restriction information corresponding to the error operating states of both network cameras A and B from the ACL 105 according to the user information in step S1010.

In step S1011, the ACT generation module 208 merges the input user information and the pieces of access restriction information corresponding to the error operating states of all the network cameras acquired in step S1010, and sets the merged information in an ACT.

In step S1012, the ACT generation module 208 returns the access control ticket (ACT) to the MFP 102 as an ACT request source.

In the example of this embodiment, when user A corresponds to "regular-level job", and when both network cameras A and B are in a normal operating state, he or she can use all the functions of the MFP based on a video of network camera A. On the other hand, when only network camera B is in a normal operating state, the user can use only the copy function. When both network cameras A and B are in an error operating state, the user can use only the Box print function.

Even when a principal monitor camera (e.g., corresponding to network camera A) has gone down, if an auxiliary monitor camera (e.g., corresponding to network camera B) is in a normal operating state, a video of the auxiliary monitor camera can be used in security management. In this case, the user can use the permitted functions of the MFP 102 based on the access restriction information of the auxiliary monitor camera in the normal operating state. A state in which the user can use functions of the MFP 102 as much as possible while restricting the functions of the MFP 102 can be maintained. Also, according to this embodiment, user-friendly security management of network devices can be implemented.

Third Embodiment

This embodiment will explain an arrangement of a security management system which can provide information that allows the user to easily understand the reason for restriction of the functions of the MFP 102 when a network camera has gone down.

Figure 11:
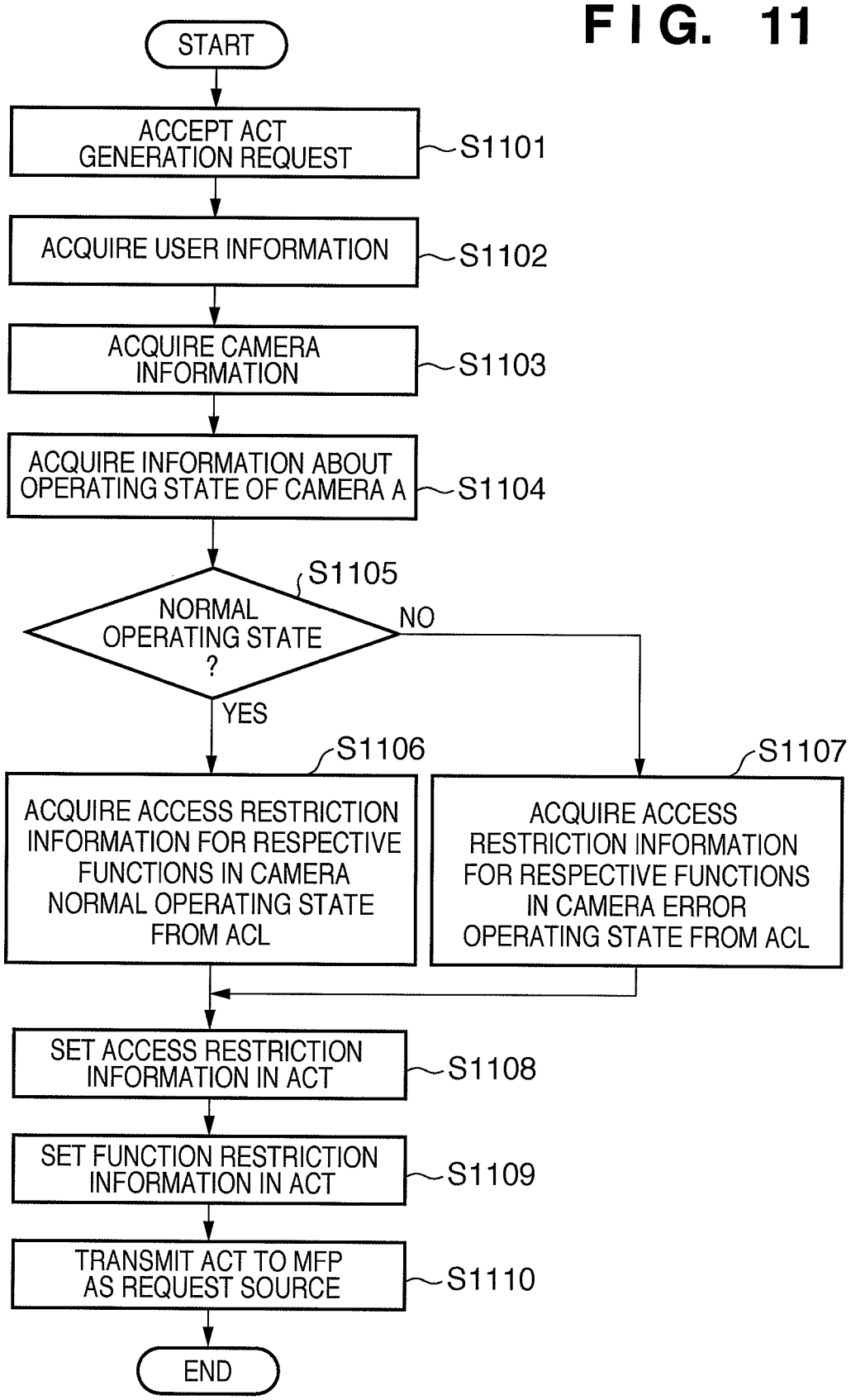
FIG. 11 is a flowchart for explaining the sequence of processing of an access control server according to the third embodiment.

FIG. 11 is a flowchart for explaining the sequence of processing of the access control server 104 according to the third embodiment. The processes in steps S1101 to S1108 in FIG. 11 are the same as those in steps S801 to S808 in FIG. 8 described in the first embodiment. A repetitive description of these processes will be avoided.

In step S1109, if a function restriction item of an ACT includes a function to be restricted due to an error operating state of a network camera, the ACT generation module 208 sets function restriction information used to identify that function in the ACT. Taking the ACL in FIG. 9 as an example, when network camera A is in an error operating state, function restriction information as information used to identify that all of copy, print, and BOX print functions are restricted is set in the ACT. On the other hand, when network camera B is in an error operating state, function restriction information as information used to identify that the copy and print functions are restricted is set in the ACT.

In step S1110, the ACT generation module 208 transmits the ACT set with the function restriction information in previous step S1109 to the MFP 102 as an ACT request source.

Figure 12:
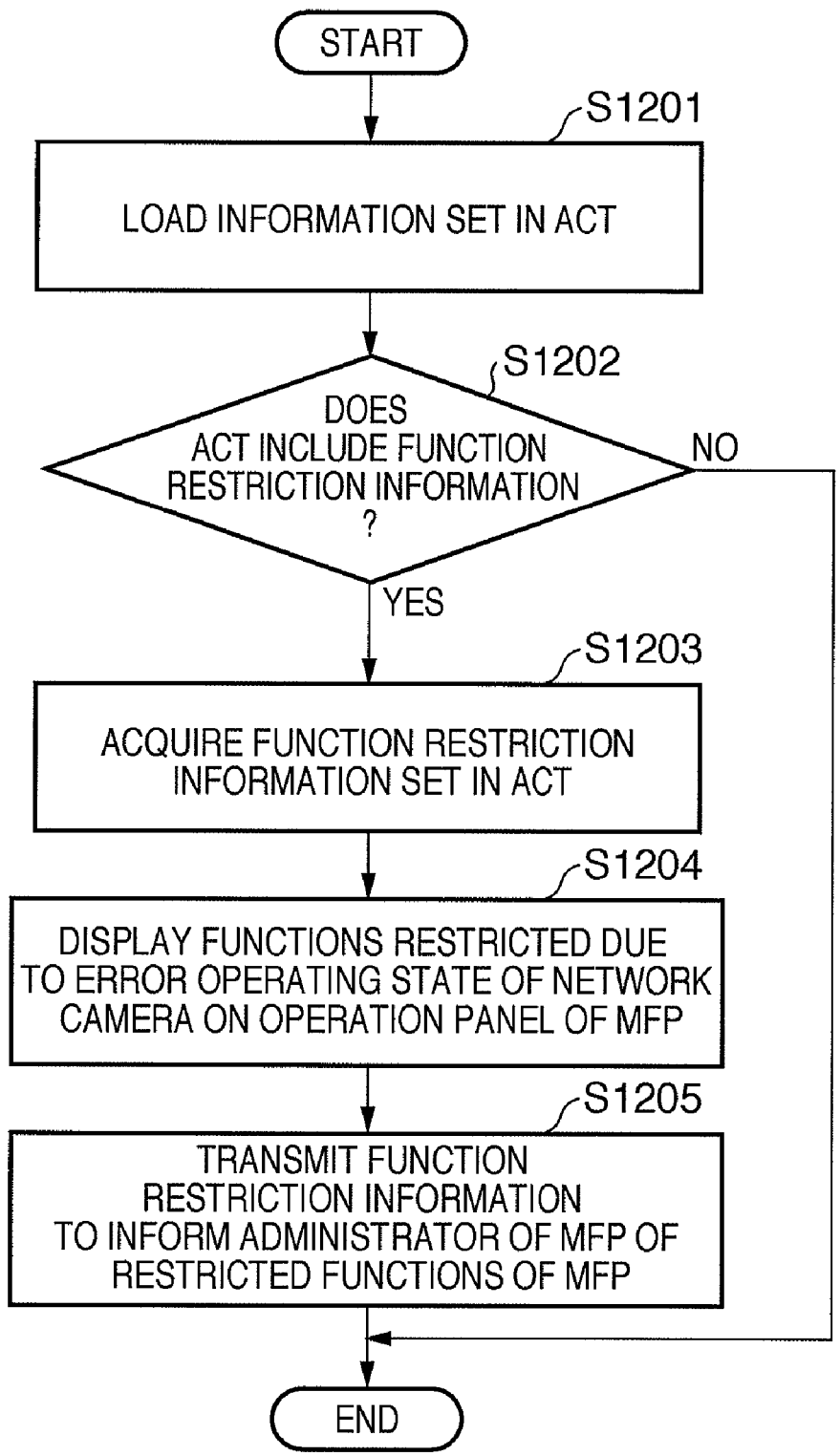
FIG. 12 is a flowchart for explaining the sequence of error display processing on an MFP 102 according to the third embodiment.

FIG. 12 is a flowchart for explaining the sequence of error display processing on the MFP 102 according to the third embodiment. This processing is executed under the overall control of the CPU 12 of the MFP 102.

In step S1201, the CPU 12 loads information set in the ACT transmitted from the access control server 104.

The CPU 12 determines in step S1202 if the ACT includes function restriction information. If it is determined in step S1202 that the ACT does not include any function restriction information, the CPU 12 executes security management of the MFP 102 based on access restriction information set in the ACT, as described in the first and second embodiments.

On the other hand, if it is determined in step S1202 that the ACT includes function restriction information, the process advances to step S1203.

In step S1203, the CPU 12 acquires the function restriction information set in the ACT so as to identify functions which are restricted due to an error operating state of the network camera.

In step S1204, the CPU 12 identifies the functions restricted in the error operating state of the network camera based on the function restriction information acquired in previous step S1203. The CPU 12 then displays the functions restricted in the error operating state of the network camera on an operation display unit of the operation unit 21 of the MFP 102. As a result, the user can recognize that the functions of the MFP 102 cannot be used due to the error operating state of the network camera.

In step S1205, the CPU 12 transmits the function restriction information to inform an administrator of the MFP 102 that the functions of the MFP 102 are restricted due to the error operating state of the network camera.

According to this embodiment, even when the network camera has gone down, information that allows the user to easily recognize the reason for restriction of the functions of the MFP 102 can be provided. Also, according to this embodiment, user-friendly security management of network devices can be implemented.

Other Embodiments

Note that the objects of the present invention are also achieved by supplying a computer-readable storage medium, which records a program code of software that can implement the functions of the aforementioned embodiments to a system or apparatus. Also, the objects of the present invention are achieved by the read-out and execution of the program code stored in the storage medium by a computer (or a CPU or MPU) of the system or apparatus.

In this case, the program code itself read out from the storage medium implements the functions of the aforementioned embodiments, and the storage medium which stores the program code constitutes the present invention.

As the storage medium for supplying the program code, for example, a flexible disk, hard disk, optical disk, magneto-optical disk, CD-ROM, CD-R, nonvolatile memory card, and ROM may be used.

The computer executes the readout program code to implement the functions of the aforementioned embodiments. Also, the present invention includes a case in which an OS (operating system) or the like running on the computer executes some or all of actual processes based on an instruction of the program code, thereby implementing the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-031024 filed on Feb. 12, 2008, which is hereby incorporated by reference herein in its entirety.

What is claimed is:

1. A device management system including an image processing apparatus which is to undergo security management, and an information processing apparatus which generates information used to control said image processing apparatus for respective functions, said image processing apparatus comprising:
an acceptance unit constructed to accept user information used to identify a user and an operation input of the user; and
a request unit constructed to generate request information including the user information used to identify the user, and to request issuance of access control information including access restriction information indicating whether or not each of the functions of said image processing apparatus can be used, and said information processing apparatus comprising:
an extraction unit constructed to extract the user information used to identify the user from the request information generated by said request unit;
a determination unit constructed to (i) execute a separation image processing for extracting a specific image from a video sensed by a network camera for sensing the user who operates the image processing apparatus, and (ii) determine whether or not the user who operates the image processing apparatus has been sensed based on the separation image processing;
an Access Control Ticket (ACT) generation unit constructed to (i) generate a first access restriction information for restricting, to the user, respective functions of the image processing apparatus in a case where it is determined that the user has been sensed by said determination unit, and (ii) generate a second access restriction information which restricts more functions to the user than the first access restriction information, in a case where it is determined that the user has not been sensed by said determination unit,
wherein said ACT generation unit generates the first access restriction information or the second access restriction information based on the user information used to identify the user in the device management system so that one or more functions restricted to each user for using the image processing apparatus are different between the first access restriction information and the second access restriction information, and
wherein said image processing apparatus has at least one function of copy function, a print function, and a Box print function; and
a generation unit constructed to generate access control information which associates the first or second access restriction information generated by the ACT generation unit with the user information, and
wherein said image processing apparatus further comprises:
a control unit constructed to control use for respective functions of said image processing apparatus with respect to the operation input in accordance with the first or second access restriction information included in the access control information generated by said generation unit.

2. The system according to claim 1, wherein when said system includes a plurality of network cameras used to monitor an operation of the user, wherein said network camera is a main network camera, and wherein said determination unit executes the separation image processing for extracting the specific image from the video sensed by the main network camera for sensing the user who operates the image processing apparatus, and determines whether or not the user who operates the image processing apparatus has been sensed based on the separation image processing,
wherein (i) in a case where it is determined that the user has not been sensed by said determination unit, said determination unit executes a second separation image processing for extracting a specific image from a video sensed by a sub network camera for sensing the user who operates the image processing apparatus, and determines whether or not the user who operates the image processing apparatus has been sensed based on the second separation image processing,
wherein (ii) in a case where it is determined that the user has been sensed by said determination unit, said determination unit does not determine, based on the video sensed by the sub network camera, whether or not the user who operates the image processing apparatus has been sensed based on the second separation image processing, and wherein an available function permitted to the image processing apparatus using the first access restriction information generated from the video of the main network camera differs from an available function permitted to the image processing apparatus using the first access restriction information generated based on the video of the sub network camera.

3. The system according to claim 1, wherein said determination unit determines that the network camera is in a normal operating state when communication with the network camera can be made, and determines that the network camera is in an error operating state when communication with the network camera cannot be made.

4. The system according to claim 3, wherein when said determination unit determines that the network camera is in the normal operating state, said acquisition unit acquires access restriction information corresponding to the user information and the normal operating state of the network camera from a the storage unit.

5. The system according to claim 3, wherein when said determination unit determines that the network camera is in the error operating state, said acquisition unit acquires access restriction information corresponding to the user information and the error operating state of the network camera from a storage unit.

6. The system according to claim 2, wherein said acquisition unit merges pieces of access restriction information acquired based on the determination results of the operating states of the plurality of network cameras, and wherein said generation unit generates access control information which associates the merged access restriction information with the user information.

7. The system according to claim 3, wherein when said determination unit determines that the network camera is in the error operating state, said generation unit sets function restriction information used to identify functions of said image processing apparatus which are restricted due to the error operating state in the access control information.

8. The system according to claim 1, wherein said control unit identifies functions restricted due to an error operating state of the network camera based on function restriction information set in the access control information, and displays the identified functions on an operation display unit of said image processing apparatus.

9. A device management method executed in a device management system including an image processing apparatus which is to undergo security management, and an information processing apparatus which generates information used to control the image processing apparatus for respective functions, said method comprising:

an acceptance step of controlling an acceptance unit of the image processing apparatus to accept user information used to identify a user and an operation input of the user;

a request step of controlling a request unit of the image processing apparatus to generate request information including the user information used to identify the user, and to request issuance of access control information including access restriction information indicating whether or not each of the functions of the image processing apparatus can be used;

an extraction step of controlling an extraction unit of the information processing apparatus to extract the user information used to identify the user from the request information generated in the request step;

a determination step of (i) executing a separation image processing for extracting a specific image from a video sensed by a network camera for sensing the user who operates the image processing apparatus, and (ii) determining whether or not the user who operates the image processing apparatus has been sensed based on the separation image processing;

an Access Control Ticket (ACT) generation step of (i) generating a first access restriction information for restricting, to the user, respective functions of the image processing apparatus in a case where it is determined that the user has been sensed in the determination step, and (ii) generating a second access restriction information which restricts more functions to the user than the first access restriction information, in a case where it is determined that the user has not been sensed in the determination step, wherein said ACT generation step generates the first access restriction information or the second access restriction information based on the user information used to identify the user in the device management system so that one or more functions restricted to each user for using the image processing apparatus are different between the first access restriction information and the second access restriction information, and wherein said image processing apparatus has at least one function of copy function, a print function, and a Box print function; and a generation step of controlling a generation unit of the information processing apparatus to generate access control information which associates the first or second access restriction information generated in the ACT generation step with the user information; and a control step of controlling a control unit of the image processing apparatus to control use for respective functions of the image processing apparatus with respect to the operation input in accordance with the first or second access restriction information included in the access control information generated in the generation step.

10. The method according to claim 9, wherein the system includes a plurality of network cameras used to monitor an operation of the user, wherein said network camera is a main network camera, and wherein the determination step executes the separation image processing for extracting the specific image from the video sensed by the main network camera for sensing the user who operates the image processing apparatus, and determines whether or not the user who operates the image processing apparatus has been sensed based on the separation image processing, wherein (i) in a case where it is determined that the user has not been sensed in the determination step, the determination step executes a second separation image processing for extracting a specific image from a video sensed by a sub network camera for sensing the user who operates the image processing apparatus, and determines whether or not the user who operates the image processing apparatus has been sensed based on the second separation image processing, wherein (ii) in a case where it is determined that the user has been sensed in the determination step, the determination step does not determine, based on the video sensed by the sub network camera, whether or not the user who operates the image processing apparatus has been sensed based on the second separation image processing, and wherein an available function permitted to the image processing apparatus using the first access restriction information generated from the video of the main network camera differs from an available function permitted to the image processing apparatus using the first access restriction information generated based on the video of the sub network camera.

11. The method according to claim 9, wherein in the determination step, it is determined that the network camera is in a normal operating state when communication with the network camera can be made, and it is determined that the network camera is in an error operating state when communication with the network camera cannot be made.

12. The method according to claim 11, wherein when it is determined in the determination step that the network camera is in the normal operating state, access restriction information corresponding to the user information and the normal operating state of the network camera is acquired from a storage unit.

13. The method according to claim 11, wherein when it is determined in the determination step that the network camera is in the error operating state, access restriction information corresponding to the user information and the error operating state of the network camera is acquired from a storage unit.

14. The method according to claim 10, wherein pieces of access restriction information acquired based on the determination results of the operating states of the plurality of network cameras are merged, and
wherein in the generation step, access control information which associates the merged access restriction information with the user information is generated.

15. The method according to claim 11, wherein when it is determined in the determination step that the network camera is in the error operating state, function restriction information used to identify functions of the image processing apparatus which are restricted due to the error operating state is set in the access control information in the generation step.

16. The method according to claim 9, wherein in the control step, functions restricted due to an error operating state of the network camera are identified based on function restriction information set in the access control information, and the identified functions are displayed on an operation display unit of the image processing apparatus.

17. An information processing apparatus which can communicate with an image processing apparatus and a network camera for sensing a user who operates the image processing apparatus, said information processing apparatus comprising:
a determination unit constructed to determine whether or not the network camera is a normal operating state;
a generation unit constructed to generate access restriction information for restricting, to the user, respective functions of the image processing apparatus,
wherein said generation unit generates a first access restriction information for restricting, to the user, respective functions of the image processing apparatus in a case where it is determined by said determination unit that the network camera is in the normal operating state,
wherein said generation unit generates a second access restriction information which restricts more functions to the user than the first access restriction information, in a case where it is determined by said determination unit that the network camera is not in the normal operating state, and
wherein said image processing apparatus has at least one function of copy function, a print function, and a Box print function.

18. The apparatus according to claim 17, wherein in a case where said information processing apparatus is not able to receive a video sensed by the network camera due to a communication failure of a network, the determination unit determines that the network camera is not in the normal operating state.

19. The apparatus according to claim 18, wherein in a case where the determination unit is not able to store the video sensed by the network camera because data amount of the video exceeds a capacity of a memory for saving the video, the determination unit determines that the network camera is not in the normal operating state.

20. The apparatus according to claim 18, wherein the determination unit executes a separation image processing for extracting a specific image to the video sensed by a network camera for sensing the user who operates the image processing apparatus, and determines whether or not the user who operates the image processing apparatus has been sensed based on the separation image processing, and
wherein in a case where it is determined that the user has not been sensed, the determination unit determines that that the network camera is not in the normal operating state.

21. An information processing method executed in an information processing apparatus which can communicate with an image processing apparatus and a network camera for sensing a user who operates the image processing apparatus, said method comprising:
a determination step of determining whether or not the network camera is in a normal operating state;
a generation step of generating access restriction information for restricting, to the user, respective functions of the image processing apparatus,
wherein the generation step generates a first access restriction information for restricting, to the user, respective functions of the image processing apparatus in a case where it is determined in the determination step that the network camera is in the normal operating state,
wherein the generation step generates a second access restriction information which restricts more functions to the user than the first access restriction information, in a case where it is determined in the determination step that the network camera is not in the normal operating state, and
wherein said image processing apparatus has at least one function of copy function, a print function, and a Box print function.

22. A non-transitory computer-readable storage medium storing a program for making a computer execute a device management method according to claim 9.

23. A non-transitory computer-readable storage medium storing a program for making a computer execute an information processing method according to claim 21.

* * * * *